United States Patent
Lee (10) Patent No.: US 6,594,560 B2
(45) Date of Patent: Jul. 15, 2003

(54) AUTOMATED-GUIDED VEHICLE SYSTEM AND METHOD FOR CONTROLLING THE SAME

(75) Inventor: Tong-hun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 162 days.

(21) Appl. No.: 09/788,404

(22) Filed: Feb. 21, 2001

(65) Prior Publication Data

US 2002/0035418 A1 Mar. 21, 2002

(30) Foreign Application Priority Data

Jul. 26, 2000 (KR) ........................................ 2000-43144

(51) Int. Cl.[7] .............................................. G06F 17/00
(52) U.S. Cl. ............................ 701/23; 701/24; 700/121
(58) Field of Search ...................... 701/23, 24; 700/121, 700/169, 256; 414/217.1, 940

(56) References Cited

U.S. PATENT DOCUMENTS

| | | | | |
|---|---|---|---|---|
| 4,836,733 A | * | 6/1989 | Hertel et al. ........... 198/341.05 |
| 5,455,894 A | * | 10/1995 | Conboy et al. ........ 414/416.03 |
| 5,798,651 A | * | 8/1998 | Aruga et al. ............. 324/158.1 |
| 5,936,416 A | * | 8/1999 | Tanaka et al. ........... 324/158.1 |
| 5,980,591 A | * | 11/1999 | Akimoto et al. ........... 29/25.01 |
| 5,997,656 A | * | 12/1999 | Kim ............................. 134/18 |
| 6,082,951 A | * | 7/2000 | Nering et al. ............ 414/217.1 |
| 6,149,379 A | * | 11/2000 | Shin et al. ................... 118/719 |
| 6,175,777 B1 | * | 1/2001 | Kim ........................... 700/121 |
| 6,224,680 B1 | * | 5/2001 | Toshima ..................... 118/719 |
| 6,270,619 B1 | * | 8/2001 | Suzuki et al. ............... 118/719 |
| 6,364,593 B1 | * | 4/2002 | Hofmeister et al. ..... 414/217.1 |

\* cited by examiner

*Primary Examiner*—Tan Q. Nguyen
(74) *Attorney, Agent, or Firm*—Staas & Halsey LLP (57) ABSTRACT

Disclosed is an automated-guided vehicle (AGV) system comprising an AGV travelling on a facility line, having vehicle body, a driver for driving the vehicle body and a transfer device for transferring a wafer to and from a cassette; and a central control device controlling an operation of the AGV, the central control device comprising a central communicator, communicating with the AGV according to a predetermined communication protocol, the AGV comprising a radio communicator, communicating with the central communicator according to the predetermined communication protocol, and a controller activating the transfer device according to a command received by the radio communicator to transfer the wafer and controlling an operation of the driver. With this configuration, an AGV system enables communication between a central control device and an AGV according to the communication protocol, thereby loading and unloading the wafers 30 one by one.

10 Claims, 4 Drawing Sheets

AUTOMATED-GUIDED VEHICLE SYSTEM AND METHOD FOR CONTROLLING THE SAME

BACKGROUND OF THE INVENTION

1. Field of Invention

The present invention relates in general to automated guided vehicle (hereinafter, "AGV") systems and methods for controlling the same, and more particularly, to an AGV system enabling communication between a central control device and an AGV so as to load and unload wafers one by one, and a method for controlling the same.

2. Description of Related Art

An AGV is one of factory automation facilities, and performs its tasks in predetermined places within a factory.

The AGV is generally comprised of a vehicle body of a rectangular box shape and a driver for driving the vehicle body. The driver is comprised of a plurality of driving wheels (not shown) installed to the lower portion of the vehicle body, driving the vehicle body, and a plurality of casters supporting the vehicle body. On one side of each driving wheel is mounted a wheel driving motor driving the driving wheel by means of a driving power supplied from a battery.

In a front part of the vehicle body is installed an obstacle sensor for sensing an obstacle. In front of the driving wheels are installed a pair of track sensors for sensing signals from objects to be sensed on a track. The AGV is comprised of an automated communicator for communication with an external central control device, and a controller controlling the respective wheel driving motors based on the signals from the obstacle sensor and the track sensor according to a command from the central control device received by the automated communicator.

Figure 4:
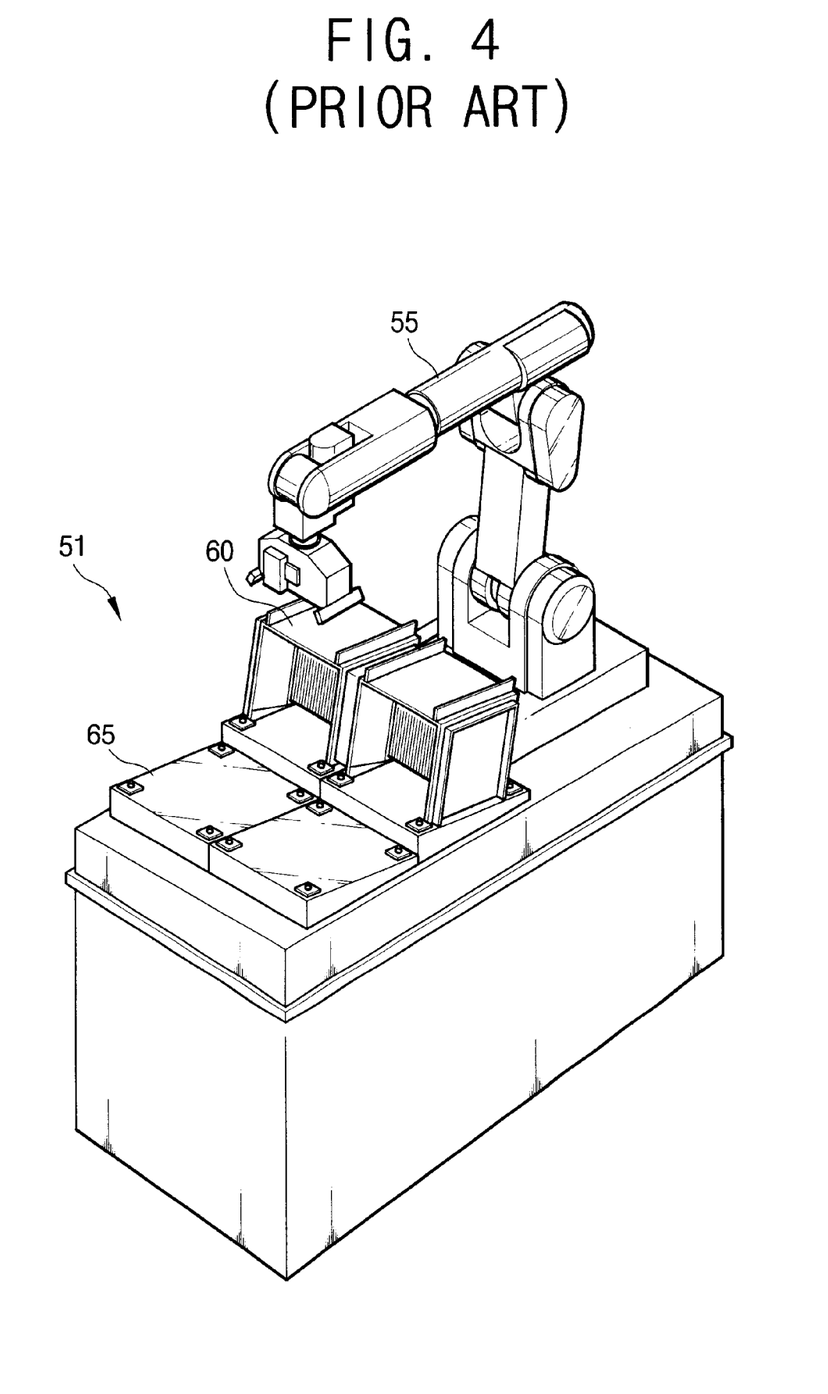
FIG. 4 is a perspective view of a conventional AGV.

An AGV for wafer transfer, as shown in FIG. 4, has a plurality of rest plates 65 and a robotic arm 55 installed on the top face of the vehicle body. A cassette 60 rests upon the rest plates 65, and a robotic arm 55 loads and unloads the cassette 60 on the rest plates 65.

The AGV 51 for wafer transfer travels along a facility line on which an inspector for inspecting the wafers is installed, and loads and unloads the cassette 60 to and from the inspector according to a command from the central control device. Generally, several inspectors of the same kind are disposed within a facility line, and therefore, each of the cassettes 60 loaded on the AGV 51 is transferred to each inspector 60. Each inspector inspects wafers contained in the cassette 60 if transferred, and transmits the inspection result and a signal indicating completion of the inspection to the central control device if the inspection of all the wafers is completed. The central control device determines based on the inspection result from each inspector whether each wafer is normal or not, and commands the AGV 51 to transfer the cassette 60 for the next process.

However, since the conventional AGV 51 transfers the cassette containing the wafers to the inspectors, the inspection result of each wafer cannot be obtained until all the wafers contained in the cassette 60 are inspected. Thus, it takes comparatively a long time to obtain the inspection result of the wafers. In addition, even when there is only a cassette to be inspected, since wafers within the cassette is to be inspected by an inspector, the other inspectors are in suspension until the inspection for all the wafers in the cassette 60 are finished, thereby lowering the efficiency in use of the inspectors and extending the inspection time.

To solve these problems, there has been developed an AGV having a transfer device provided with a single cassette and loading the wafers one by one on an inspector. In line with the development of such an AGV, there is a need of a new communication protocol system for communication between a central control device and an AGV to transfer the wafers one by one.

SUMMARY OF THE INVENTION

Accordingly, the present invention has been made keeping in mind the above-described shortcomings and need, and an object of the present invention is to provide an AGV system having a protocol system for communication between a central control device and an AGV so as to load and unload the wafers one by one, and a method for controlling the same.

This and other objects of the present invention may be achieved by a provision of an automated-guided vehicle (AGV) system comprising an AGV travelling on a facility line, having a vehicle body, a driver for driving the vehicle body and a transfer device for transferring a wafer to and from a cassette; and a central control device controlling an operation of the AGV, the central control device comprising a central communicator, communicating with the AGV according to a predetermined communication protocol, the AGV comprising a radio communicator, communicating with the central communicator according to the predetermined, communication protocol, and a controller activating the transfer device according to a command received by the radio communicator to transfer the wafer and controlling an operation of the driver.

The central control device transmits a load command to load the wafer in the AGV onto an equipment on the facility line, and the load command is comprised of at least one of a slot number of the wafer received within a slot of the cassette, a rotational position of the wafer, and an information as to whether a charge is given to the AGV.

Preferably, the central control device transmits a transfer command to transfer the wafer from the equipment on the facility line to the AGV, and the transfer command is comprised of at least one of a slot number of the wafer received within the slot of the cassette, a rotational position of the wafer, and information as to whether a charge is given to the AGV.

Preferably, the central control device transmits a command requesting to report an operation state of the AGV, the report command being comprised of at least one of an operation mode of the AGV, an operation state of the AGV, a load state of the wafer within the cassette and the consumed amount of a battery of the AGV.

According to another aspect of the present invention, this and other objects may be achieved by a method for controlling an AGV system comprising an AGV travelling on a facility line, having a vehicle body, a driver for driving the vehicle body and a transfer device for transferring a wafer to and from a cassette, and a central control device controlling an operation of the AGV, comprising the steps of transmitting a command according to a predetermined communication protocol from the central control device to the AGV; and activating the transfer device according to the command transmitted from the central control device to transfer the wafer and controlling an operation of the driver.

The command is comprised of at least one of a load command to load the wafer of the AGV onto the equipment on the facility line, a transfer command to transfer the wafer from the equipment to the AGV, and a command requesting to report an operation state of the AGV.

Preferably, the load command and the transfer command are respectively comprised of at least one of a slot number of the wafer received within the slot of the cassette, a rotational position of the wafer, and an information as to whether a charge is given to the AGV.

Desirably, the report command is comprised of at least one of an operation mode of the AGV, an operation state of the AGV, a load state of the wafer within the cassette and the consumed amount of a battery of the AGV.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Figure 1:
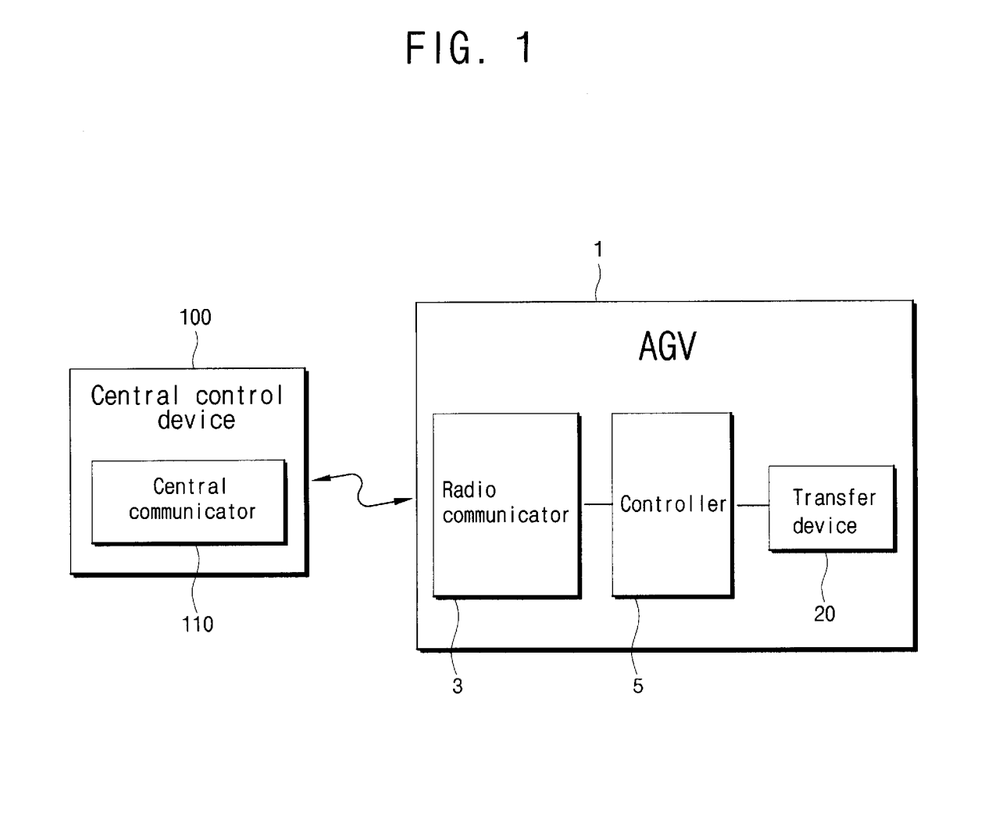
FIG. 1 is a schematic view showing a configuration of an AGV system according to the present invention.

An AGV system according to the present invention is, as shown in FIG. 1, comprised of an AGV 1 travelling on a facility line, to transfer and load wafers, and a central control device 100 controlling an operation of the AGV 1.

The central control device 100 controls operations of the AGV 1 and inspectors (not shown) installed in the facility line based on information collected by the inspectors and the AGV 1. In the central control device is installed a central communicator 110 transmitting a command to the AGV 1 by radio communication and receiving a response from the AGV 1.

Figure 2:
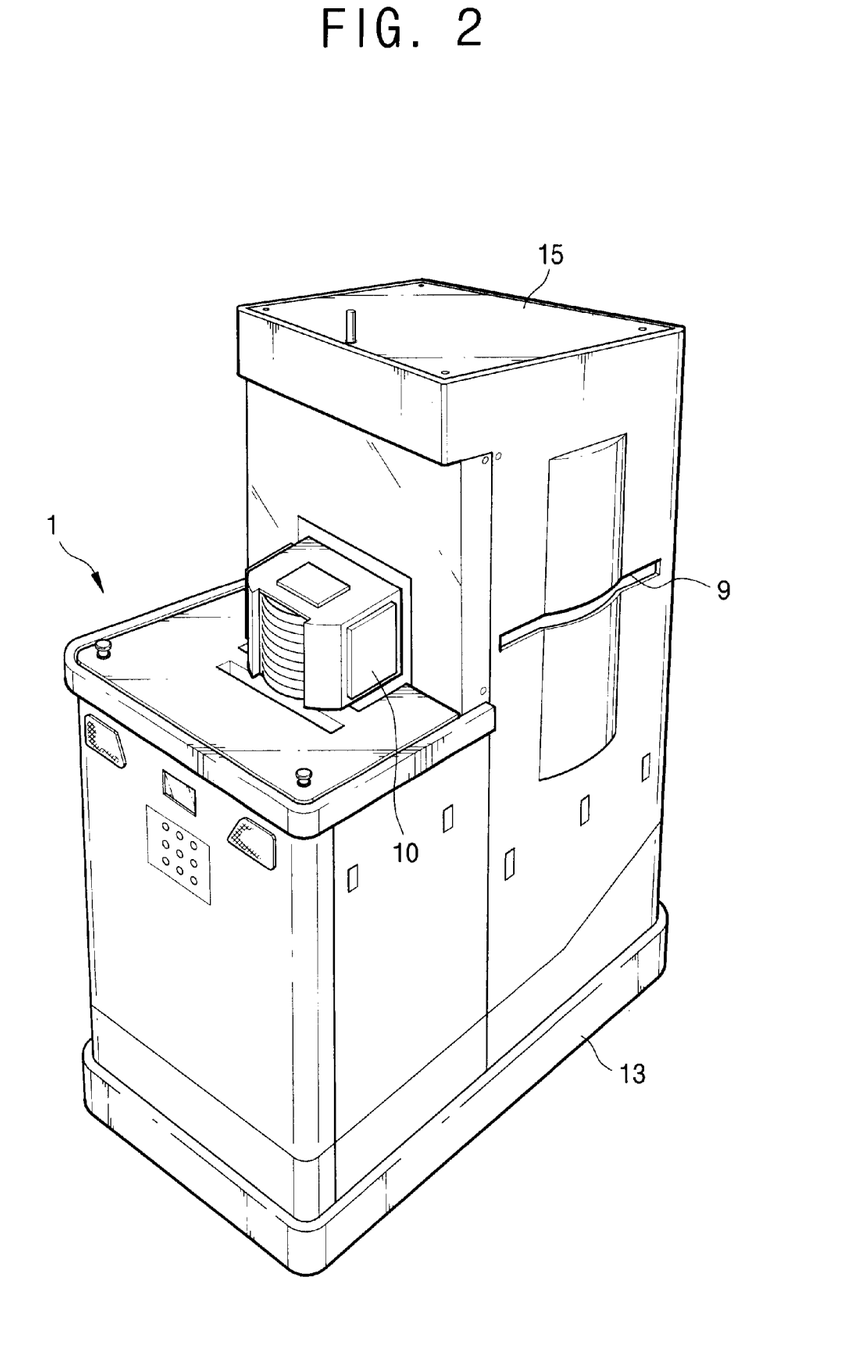
FIG. 2 is a perspective view of the AGV of FIG. 1.
Figure 3:
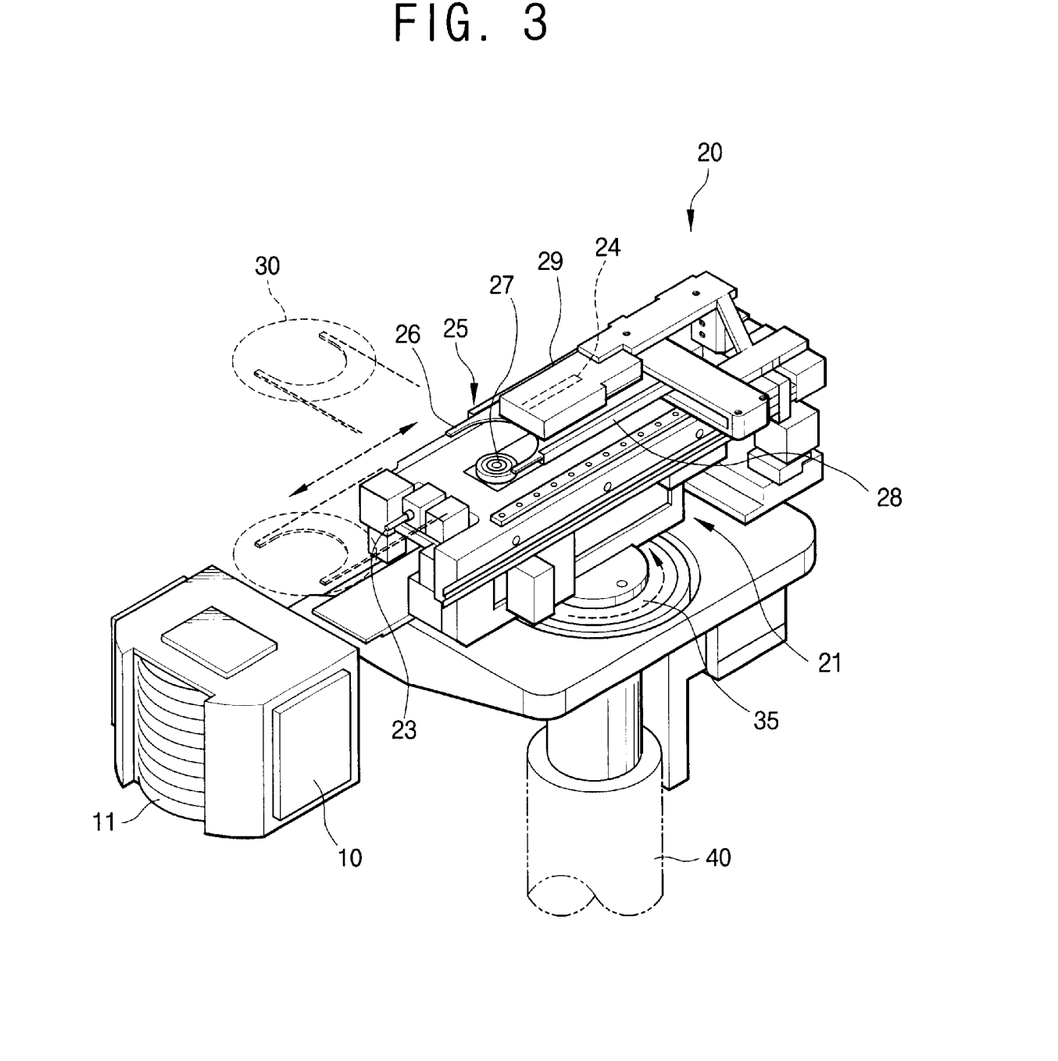
FIG. 3 is a perspective view of a transfer device of the AGV of FIG. 2.

The AGV 1 is, as shown in FIGS. 2 and 3, comprised of a cassette 10 on the top of a vehicle body 13 of the AGV 1, containing wafers, and a transfer device 20 for loading and unloading the wafers 30 into and out of the cassette 10. The transfer device 20 is accommodated in a casing 15 of a rectangular box shape installed on the top of the vehicle body 13. The AGV 1 is comprised of a radio communicator 3 for communication with the central control device 100, and a controller 5 controlling operations of the transfer device 20 and other components according to a command from the central control device 100 received by the radio communicator 3.

The cassette 10 has a number of slots 11 disposed vertically so as to allow a number of wafers to be loaded, and the slots 11 are spaced from one another at a predetermined interval, thereby facilitating an access of a horizontal arm 25 to be described later when loading and unloading the wafers 30. The cassette 10 is formed with a port (not shown) opened toward the casing 15, through which the wafers 30 are transferred. The casing 15 has an opening facing the opening port of the cassette 10. In a side of the casing 15 is formed a transfer slit 9 through which the wafers 30 are transferred to the inspector.

The transfer device 20 is comprised of a main body 21, a horizontal arm 25 installed on the top of the main body 21, picking up wafers 30 in the cassette 10 to transfer them to the casing 15, and a horizontal arm 25 driving unit driving the horizontal arm 25. The arm driving unit is comprised of a guide rail 28 formed on the main body 21, guiding a sliding movement of the horizontal arm 25, and a horizontal arm 25 motor (not shown) driving the horizontal shaft 25. On the bottom of the main body 21 are installed a rotation shaft 35, for rotating the main body 21, and a rotation arm motor (not shown) for rotating the rotation shaft 35. The rotation shaft 35 is moved up and down by an elevation driving unit. The elevation driving unit is comprised of a hollow shaft 40 coupled to the bottom of the rotation shaft 35 and an elevation arm motor (not shown) elevating the rotation shaft 35. The horizontal arm 25 motor, the rotation arm motor and the elevation arm motor are respectively comprised of a step motor.

On the free end of the horizontal arm 25 are formed a pair of wafer sitting parts 26 spaced from each other by a semi-circle opening formed therebetween. On the wafer seating parts 26 are seated the wafers 30 when the wafers are loaded and unloaded. On the top of the horizontal arm 25 is installed a cover plates 29 longitudinally extended to cover a portion of the wafer seating part 26. On the bottom face of the cover plate 29 is installed a wafer sensor 24 sensing a position of the wafer 30, adjacent to the horizontal arm 25. The water sensor 24 is disposed longitudinally relative to the horizontal arm 25, sensing a position of the wafer 30 by means of a light emission.

Beneath the horizontal arm 25 is installed a chuck 27 holding the wafer 30. The chuck 27 is installed to the main body 21 so as to be disposed between the wafer seating parts 26 when the horizontal arm 25 is withdrawn. The chuck 27 holds the wafer 30 seated thereon by vacuum. The chuck 27 is capable of being elevated, and also being rotated.

In front of the chuck 27 is installed a scanner part 23 comprised of an optical sensor, sensing whether the wafer 30 is loaded in each slot 11 of the cassette 10. The scanner part 23 is operated, for example, when loading the cassette 10 in the AGV 1, according to a signal from the controller 5. On the inner top of the casing 15 adjacent to the cassette 10 is installed a reader part (not shown) reading an identity number of the wafer 30 loaded to and unloaded from the cassette 10. The reader part is comprised of an optical character reader (OCR).

Where the wafer 30 is transferred to a designated inspector by means of the above-structured AGV 1, the transfer device 20 is operated in the following process. First, a command to transfer a wafer 30 having a random identity number, being loaded in a slot 11, to an inspector is received by the AGV 1 from the central control device 100, and then the controller 5 controlling an operation of the AGV 1 elevates the horizontal arm 25 so that the horizontal arm 25 is disposed to be inserted under the wafer 30 in its corresponding slot 11. Then, the horizontal arm 25 is moved so that the horizontal arm 25 is inserted under the wafer 30. The rotation shaft 35 is then elevated so as to allow the wafer to be seated on the wafer seating part 26 of the horizontal arm 25. Subsequently, the horizontal arm 25 is withdrawn to the main body 21. Then, the reader part photographs the identity number of the wafer 30 seated on the wafer seating parts 26 and the controller 5 determines whether the wafer 30 is a desired wafer, according to the result of the photograph.

If the horizontal arm 25 is withdrawn, the wafer seated on the wafer seating parts 26 become placed above the top of the chuck 27, and the controller 5 elevates the chuck 27 to hold the wafer 30 thereon. When the wafer 30 is held on the chuck 27, the controller 5 rotates the chuck 27 and the wafer sensor 24 senses the wafer 30 by means of a light emission. The controller 5 determines the eccentricity of the wafer according to the sensing result from the wafer sensor 24, and stops the rotation of the chuck 27 when the largest eccentricity of the wafer 30 is sensed. Then, the controller 27 descends the chuck 27 to allow the wafer 30 to be seated on the wafer seating parts 26, and adjusts the horizontal arm 25 to a predetermined length so as to allow the center of the wafer 30 to be aligned with the chuck 27. Next, the controller 5 elevates the chuck 27 so as to hold the wafer 30. The controller 5 performs a pre-alignment to rotate the wafer 30 to a position required by the inspector by rotating the chuck 27, and again descends the chuck 27 so as to allow the wafer 30 to be seated on the wafer seating parts 26.

If the position of the wafer 30 drawn from the cassette 10 is adjusted, the controller 5 rotates the rotation shaft 35 to allow the horizontal arm 25 to be directed toward the inspector, and ascends or descends the rotation shaft 35 so as to dispose the horizontal arm 25 in front of the transfer slit 9. Then, as shown in FIG. 3, the horizontal arm 25 draws out the wafer through the transfer slit 9 and transfers the wafer to the inspector. The inspector picks up the transferred wafer 30 and loads it into the inspector.

When transferring the wafer 30 to the cassette 10 from the inspector, the processes loading the wafer 30 on the inspector from the cassette 10 are performed in reverse.

To transfer the wafer 30 relative to the inspector in an AGV system, basic information necessary for the transfer and load operation of the wafer 30 is transmitted to the AGV from the central control device 100. To check the progress of the operation by the AGV 1, a communication protocol to allow the central control device 100 and the AGV 1 to communicate with each other is necessary.

The communication protocol will be described in compliance with the transfer of the wafer by the AGV 1.

Where a wafer 30 is transferred to the cassette 10 of the AGV 1 from the inspector on the facility line, the central control device 100 transmits a command including a slot number of the wafer 30, a rotational position of the wafer 30, a charging command of the AGV in the course of the transfer, etc. to the AGV.

The transfer command is transmitted in the form as seen in Tables 1 and 2.

TABLE 1

| $ | Y | ID | N1 | N2 | M | A | C | B | B1 | B2 | ... | B15 | B1 | CR | LF |
|---|---|---|---|---|---|---|---|---|---|---|---|---|---|---|---|

TABLE 2

| $ | Y | ID | N1 | N2 | M | A | C | X | CR | LF |
|---|---|---|---|---|---|---|---|---|---|---|

Here, $ is a symbol indicating a start of the transfer command, Y is a symbol indicating that the transmitted command is a transfer command. ID indicates information indicating the ordinal number of the transmitted command. N1 and N2 are information to calculate the slot number of the cassette 10 of the AGV 1 including the wafer 30 therein. The slot number of the cassette 10 is calculated by the expression of N1*10+N2. M indicates the number of a stage in the inspector from which the wafer 30 is transferred, A indicates a rotational position of the wafer 30. Generally, the rotational position of the wafer 30 is set to 0°, 90°, 180° and 270°, and A is given 0 if the rotational position of the wafer 30 is 0°, 3 if the rotational position of the wafer 30 is 90°, 5 if the rotational position of the wafer 30 is 180° and 7 if the rotational position of the wafer 30 is 270°. C indicates whether the AGV needs charge or not in the course of transfer; and T indicates that the charge is needed and F indicates that he charge is not needed. B indicates whether the slot number, of the wafer 30 will be used, and if the slot number will be used, B will be given B1 to B16. If the slot number will not be used, X will be indicated as seen in Table 2. CR and LF indicate that the transfer command terminates.

When the transfer command is received by the AGV 1, the AGV 1 transmits a response to the central control device 100 as seen in Table 3.

TABLE 3

| $ | y | ID | X | CR | LF |
|---|---|---|---|---|---|

Here, y is a symbol indicating a start of the transfer response, and ID indicates information indicating the ordinal number of the received command, as in the transfer command. X indicates a state of the AGV 1, A (Acknowledged) indicates that the AGV acknowledged the transfer command, B (Busy) indicates that AGV is operating a different task, E (Error State) indicates that the AGV is in the state of error, P (Protocol Error) indicates that the transfer command is abnormal, and D (Data Logic Error) indicates that the transfer command is for an impossible task or insignificant task. For example, D represents the case where a charging command is given to a position which is not a correct charging position.

One example of the transfer command from the central control device 100 is provided in Table 4.

TABLE 4

| $ | Y | 6 | 0 | 1 | 1 | 3 | F | B | T | E | S | T | ... | CR | LF |
|---|---|---|---|---|---|---|---|---|---|---|---|---|---|---|---|

Since ID is 6, this indicates that the transfer command is $6^{th}$ command; and since N1 and N2 are 0 and 1, respectively. N1*10+2=2, that is, the slot number is 2. The stage number of the inspector is 1; and the rotational position 3 of the wafer 30 indicates 90°. F indicates that no charge is needed, B indicates that the identity number of the wafer 30 is used, and TEST . . . is the identity number. CR and LF are represented in special characters in reality.

The transfer response from the AGV 1 with respect to the transfer command will be given in Table 5, for example.

TABLE 5

| $ | y | 6 | A | CR | LF |
|---|---|---|---|---|---|

As in the transfer command, ID is 6 in the transfer response. A indicates that the transfer command is acknowledged and the transfer will be performed according to the transfer command.

On the other hand, where the wafer 30 is loaded on the stage of the inspector from the cassette 10 of the AGV. 1, a load command is transmitted to the AGV 1 from the central control device 100 as seen in Tables 6 and 7.

TABLE 6

| $ | J | ID | N1 | N2 | M | A | C | B | B1 | B2 | ... | B15 | B1 | CR | LF |
|---|---|---|---|---|---|---|---|---|---|---|---|---|---|---|---|

TABLE 7

| $ | J | ID | N1 | N2 | M | A | C | X | CR | LF |
|---|---|----|----|----|---|---|---|---|----|----|

Here, J is a symbol indicating a load command, and the rest information and sequence are identical to those of the transfer command.

The AGV 1 receiving the load command transmits a load response to the central control device 100 as seen in Table 8.

TABLE 8

| $ | j | ID | X | CR | LF |
|---|---|----|---|----|----|

Here, j is a symbol indicating the load response, and the rest information and sequence are identical to those of the transfer response.

While the AGV 1 is performing a transfer or load operation according to the transfer or load command from the central control device 100, the central control device 100 continuously transmits a command to report an operation state as seen in Table 9, to inspect the operation state of the AGV 1.

TABLE 9

| $ | S | CR | LF |
|---|---|----|----|

Here, S indicates the report command requesting to report an operation state of the AGV 1.

The AGV 1 receiving the report command transmits a report response as seen in Table 10.

TABLE 10

| $ | s | M | S | N1 | N2 | N3 | B | C | W1 | W2 | W3 | W4 | W5 | ID1 | ID2 | CR | LF |
|---|---|---|---|----|----|----|---|---|----|----|----|----|----|-----|-----|----|----|

Here, s is a symbol indicating the report response to the report command. M indicates an operation mode of the AGV 1, a manual operation. Instead of M, A indicates an automatic operation and C indicates a charge operation. S indicates a state of the AGV 1, specifically indicating whether the AGV is travelling, is performing a transfer or load operation or finishes the transfer or load operation, etc. N1, N2, N3 indicates numbers of the facility lines where the AGV has recently passed, and B indicates the consumed amount of a battery. C is a location to indicate whether the cassette 1 is in existence or not. W1 through W5 are locations to indicate that the wafers 30 within their respective slots are mounted. W1 through W5 are represented as seen in Table 11.

TABLE 11

| 100xxxxx | 100xxxxx | 100xxxxx | 100xxxxx | 100xxxxx |
|----------|----------|----------|----------|----------|

Generally, the cassette 10 contains 25 wafers 30 therein. The first 100 seen in each column of Table 11 is a meaningless data. The data locations expressed as "x" indicates whether the wafer 30 is loaded in each slot. W1, the first column, indicates whether the wafers are loaded in the slot numbers 1 through 5; and similarly, the last column W5, indicates whether the wafers are loaded in the slot numbers 21 through 25. Where they are loaded, 1 is indicated, and where they are not loaded, 0 is indicated.

ID1 indicates the number of a previous command which has been performed by the AGV, ID2 indicates the number of a command currently in operation. Following ID2, an error data to indicate an error of the AGV, and a debugging data used where an unspecified command is received, can be indicated.

As described above, the present invention has the communication protocol between the central control device 100 and the AGV 1. Owing to the communication protocol, the wafers 30 can be transferred to the inspector one by one. In addition, an operation state can be identified through the communication between the central control device 100 and the AGV 1 whether the command from the central control device 100 is performed in good order by the AGV 1. Accordingly, the central control device 100 can issue an appropriate operation command according to the operation state, thereby facilitating a control of the AGV 1 in the course of operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automated-guided vehicle (AGV) system, comprising:
    an AGV traveling on a facility line, having a vehicle body;
    a driver to drive the vehicle body;
    a transfer device to transfer a wafer to and from a cassette; and
    a central control device to control an operation of the AGV, wherein
        the central control device includes a central communicator to communicate with the AGV according to a predetermined communication protocol, and
        the AGV includes a radio communicator to communicate with the central communicator according to the predetermined communication protocol, and a controller to activate the transfer device according to a command received by the radio communicator to transfer the wafer and to control an operation of the driver.

2. The system according to claim 1, wherein the central control device transmits a load command to load the wafer in the AGV onto an equipment on the facility line, and the load command includes at least one of a slot number of the wafer received within a slot of the cassette, a rotational position of the wafer, and an information as to whether a charge is given to the AGV.

3. The system according to claim 2, wherein the central control device transmits a transfer command to transfer the wafer from the equipment on the facility line to the AGV, and the transfer command includes at least one of a slot number of the wafer received within the slot of the cassette, a rotational position of the wafer, and information as to whether a charge is given to the AGV.

4. The system according to claim 3, wherein the central control device transmits a command requesting to report an operation state of the AGV, the report command including at least one of an operation mode of the AGV, an operation state of the AGV, a load state of the wafer within the cassette and a consumed amount of a battery of the AGV.

5. A method to control an AGV system including an AGV traveling on a facility line, having a vehicle body, a driver to drive the vehicle body, a transfer device to transfer a wafer to and from a cassette, and a central control device to control an operation of the AGV, the method comprising transmitting a command according to a predetermined communication protocol from the central control device to the AGV; and activating the transfer device according to the command transmitted from the central control device to transfer the wafer and controlling an operation of the driver.

6. The method according to claim 5, wherein the command includes at least one of a load command to load the wafer of the AGV onto the equipment on the facility line, a transfer command to transfer the wafer from the equipment to the AGV, and a command requesting to report an operation state of the AGV.

7. The method according to claim 6, wherein the load command and the transfer command respectively include at least one of a slot number of the wafer received within the slot of the cassette, a rotational position of the wafer, and an information as to whether a charge is given to the AGV.

8. The method according to claim 6, wherein the report command includes at least one of an operation mode of the AGV, an operation state of the AGV, a load state of the wafer within the cassette and a consumed amount of a battery of the AGV.

9. An automated-guided vehicle (AGV) system, comprising:

an AGV to travel on a facility line, and having a vehicle body;

a driver to drive the vehicle body;

a transfer device to transfer a plurality of wafers to and from a cassette; and a central control device to control an operation of the AGV, wherein the central control device includes a central communicator to communicate with the AGV according to a predetermined communication protocol, and the AGV includes a radio communicator to communicate with the central communicator according to the predetermined communication protocol, and a controller to activate the transfer device according to a command received by the radio communicator to transfer the plurality of wafers one by one and to control an operation of the driver.

10. An automated-guided vehicle (AGV) system including an AGV traveling on a facility line, having a vehicle body and a driver to drive the vehicle body, the AGV system comprising:

a transfer device to transfer a plurality of wafers contained in the cassette to and from a cassette; and a central control device having a central communicator to communicate with the AGV according to a predetermined communication protocol, and to control an operation of the AGV, wherein the AGV includes a radio communicator to communicate with the central communicator according to the predetermined communication protocol, and a controller to activate the transfer device according to a command received by the radio communicator to transfer the plurality of wafers one by one.

* * * * *

UNITED STATES PATENT AND TRADEMARK OFFICE
CERTIFICATE OF CORRECTION

PATENT NO. : 6,594,560 B2
DATED : July 15, 2003
INVENTOR(S) : Tong-hun Lee

It is certified that error appears in the above-identified patent and that said Letters Patent is hereby corrected as shown below:

Column 8,
Line 30, change "traveling" to -- to travel --; and insert -- and -- after first occurrence of ",".

Signed and Sealed this

Thirtieth Day of December, 2003

JAMES E. ROGAN
*Director of the United States Patent and Trademark Office*